(12) United States Patent
Beers et al.

(10) Patent No.: US 10,661,906 B2
(45) Date of Patent: May 26, 2020

(54) FAN AND COMPRESSOR HOUSING FOR AN AIR CYCLE MACHINE

(71) Applicant: Hamilton Sundstrand Corporation, Windsor Locks, CT (US)

(72) Inventors: Craig M. Beers, Wethersfield, CT (US); Christopher McAuliffe, Windsor, CT (US); Brent J. Merritt, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 546 days.

(21) Appl. No.: 14/494,282

(22) Filed: Sep. 23, 2014

(65) Prior Publication Data

US 2016/0083099 A1    Mar. 24, 2016

(51) Int. Cl.
| | | |
|---|---|---|
| *B64D 13/06* | (2006.01) | |
| *F04D 29/52* | (2006.01) | |
| *F04D 29/64* | (2006.01) | |
| *F04D 29/42* | (2006.01) | |
| *F04D 29/62* | (2006.01) | |
| *F04D 25/02* | (2006.01) | |

(52) U.S. Cl.
CPC .......... *B64D 13/06* (2013.01); *F04D 25/024* (2013.01); *F04D 29/4206* (2013.01); *F04D 29/522* (2013.01); *F04D 29/624* (2013.01); *F04D 29/644* (2013.01)

(58) Field of Classification Search
CPC ..... B64D 13/06; F04D 25/024; F04D 29/644; F04D 29/624; F04D 29/522; F04D 29/4206

USPC ............... 415/168.2, 170.1, 214.1, 215.1
See application file for complete search history.

(56) References Cited

U.S. PATENT DOCUMENTS

| | | | | | |
|---|---|---|---|---|---|
| 4,721,313 | A | * | 1/1988 | Pennink | ............... F01D 11/02 |
| | | | | | 277/412 |
| 5,309,735 | A | * | 5/1994 | Maher, Jr. | ............ B64D 13/00 |
| | | | | | 417/406 |
| 6,151,909 | A | | 11/2000 | Carter et al. | |

(Continued)

FOREIGN PATENT DOCUMENTS

| | | |
|---|---|---|
| CN | 101882817 A | 11/2010 |
| CN | 102221016 A | 10/2011 |

(Continued)

OTHER PUBLICATIONS

First Chinese Office Action for Chinese Patent Application No. 201510398376.7, dated Jul. 2, 2018, 19 pages.

(Continued)

*Primary Examiner* — Dwayne J White
*Assistant Examiner* — Danielle M. Christensen
(74) *Attorney, Agent, or Firm* — Kinney & Lange, P.A.

(57) ABSTRACT

A housing for an air cycle machine includes a housing with a first end and a second end opposite the first end, a first duct adjacent the first end of the housing with an air inlet and an air outlet, a second duct adjacent the second end of the housing with an air inlet and an air outlet, and a collar in the housing extending into the second duct. The collar includes a first annular surface facing radially inward and configured to engage a journal bearing and a second annular surface facing radially inward and configured to engage a rotating shaft, wherein the second surface is monolithic with the housing.

15 Claims, 4 Drawing Sheets

(56) References Cited

U.S. PATENT DOCUMENTS

| | | |
|---|---|---|
| 8,770,928 B2 | 7/2014 | Chrabascz et al. |
| 9,086,077 B2 | 7/2015 | Boufflert et al. |
| 9,103,568 B2 | 8/2015 | Beers et al. |
| 9,470,234 B2 | 10/2016 | Rosen et al. |
| 9,546,669 B2 | 1/2017 | Beers et al. |
| 9,790,958 B2 | 10/2017 | Colson et al. |
| 10,113,558 B2 | 10/2018 | Chrabascz et al. |
| 2009/0053051 A1 | 2/2009 | Cvjeticanin |
| 2011/0164973 A1 | 7/2011 | Smith et al. |
| 2011/0229313 A1* | 9/2011 | Beers .................. B64D 13/06 415/180 |
| 2012/0195752 A1 | 8/2012 | Lopez Partida et al. |
| 2013/0177399 A1 | 7/2013 | McAuliffe et al. |
| 2013/0287555 A1* | 10/2013 | Rosen .................. F04D 17/122 415/182.1 |
| 2014/0030080 A1 | 1/2014 | Chrabascz et al. |
| 2014/0199167 A1 | 7/2014 | Beers et al. |
| 2015/0098814 A1 | 4/2015 | Colson et al. |
| 2015/0233386 A1 | 8/2015 | Beers et al. |
| 2016/0083099 A1 | 3/2016 | Beers et al. |
| 2016/0097401 A1 | 4/2016 | Beers et al. |
| 2016/0281721 A1 | 9/2016 | Army, Jr. et al. |
| 2017/0107993 A1 | 4/2017 | Colson et al. |
| 2017/0191499 A1 | 7/2017 | Chrabascz et al. |
| 2017/0321722 A1 | 11/2017 | Chrabascz et al. |
| 2019/0078468 A1 | 3/2019 | Haas et al. |

FOREIGN PATENT DOCUMENTS

| | | |
|---|---|---|
| CN | 102400942 A | 4/2012 |
| CN | 102562641 A | 7/2012 |
| CN | 102713303 A | 10/2012 |
| CN | 103062130 A | 4/2013 |
| CN | 203109694 U | 8/2013 |
| CN | 103375425 A | 10/2013 |
| CN | 104903587 A | 9/2015 |
| EP | 3073121 A1 | 9/2016 |

OTHER PUBLICATIONS

Second Chinese Office Action for Chinese Patent Application No. 201510398376.7 dated Mar. 4, 2019, 27 pages.

Extended European Search Report for European Patent Application No. 18248280.2, dated May 22, 2019, 7 pages.

* cited by examiner

FAN AND COMPRESSOR HOUSING FOR AN AIR CYCLE MACHINE

BACKGROUND

The present disclosure relates to aircraft environmental control systems. More specifically, the present disclosure relates to a fan and compressor housing for an air cycle machine.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

Air cycle machines typically include rotating components mounted to a tie rod and a static housing surrounding the rotating components. The static housing can include multiple pieces that are fastened together. The static housing pieces typically include soft material seals positioned between the static housing and the rotating components. For instance, the soft material seals can be a polyimide material. The soft material seals allow the rotating components to easily rotate within the static housing and provide a surface upon which the rotating components can slide. The soft material seals are also designed to control air leakage between the parts they are sealing. Some air leakage can be allowed so that the air can be used to lubricate and cool journal bearings in the air cycle machine.

SUMMARY

A housing for an air cycle machine includes a housing with a first end and a second end opposite the first end, a first duct adjacent the first end of the housing with an air inlet and an air outlet, a second duct adjacent the second end of the housing with an air inlet and an air outlet, and a collar in the housing extending into the second duct. The collar includes a first annular surface facing radially inward and configured to engage a journal bearing and a second annular surface facing radially inward and configured to engage a rotating shaft, wherein the second surface is monolithic with the housing.

An air cycle machine includes a tie rod that is configured to rotate about an axis, a fan section with a fan rotor mounted to the tie rod, a compressor section with a compressor rotor mounted to the tie rod, and a first turbine section with a first turbine rotor mounted to the tie rod. The air cycle machine further includes a first turbine housing and a fan and compressor housing connected to the first turbine housing. The fan and compressor housing includes a first end, a second end adjacent to the first turbine housing and opposite of the first end, a fan duct adjacent to the first end of the fan and compressor housing, wherein the fan rotor is positioned in the fan duct, a compressor duct adjacent to the second end of the fan and compressor housing, wherein the compressor rotor is positioned in the compressor duct, and an annular collar in the housing and extending towards the first end of the fan and compressor housing. The annular collar includes a first annular surface facing radially inward to engage a journal bearing and a second annular surface facing radially inward to engage a rotating shaft, wherein the second annular surface is configured to provide a sealing surface that is monolithic with the housing.

DETAILED DESCRIPTION

Figure 1:
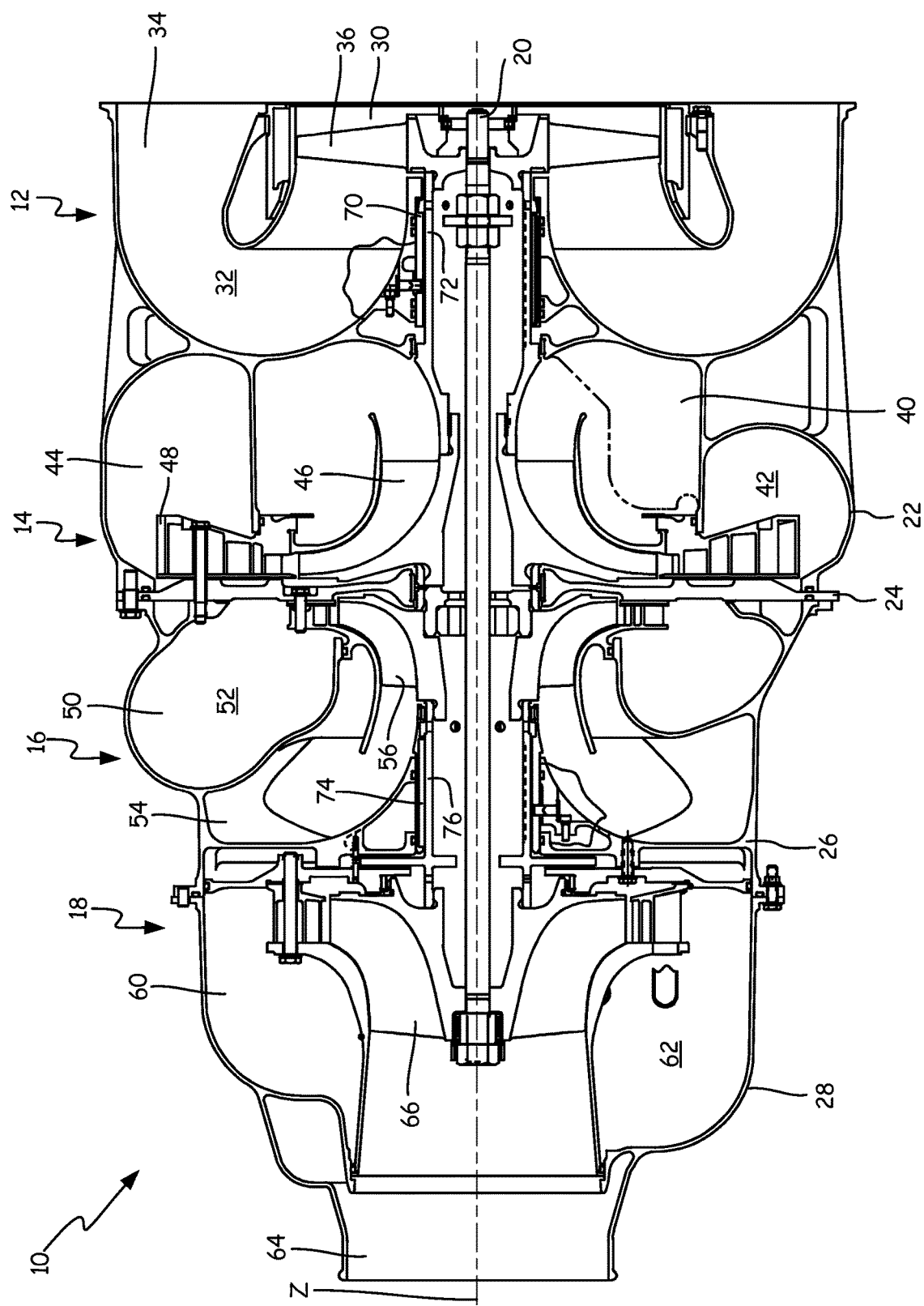
FIG. 1 is a cross-sectional view of an air cycle machine.

FIG. 1 is a cross-sectional view of air cycle machine 10, which includes fan section 12, compressor section 14, first turbine section 16, second turbine section 18, tie rod 20, fan and compressor housing 22, seal plate 24, first turbine housing 26, and second turbine housing 28. Also shown in FIG. 1 is axis Z.

Fan section 12, compressor section 14, first turbine section 16, and second turbine section 18 are all mounted on tie rod 20. Tie rod 20 rotates about axis Z. Fan and compressor housing 22 is connected to seal plate 24 and first turbine housing 26 with fasteners. Seal plate 24 separates flow paths in fan and compressor housing 22 from flow paths in first turbine housing 26. First turbine housing 26 is connected to second turbine housing 28 with fasteners. Fan and compressor housing 22, first turbine housing 26, and second turbine housing 28 together form an overall housing for air cycle machine 10. Fan and compressor housing 22 houses fan section 12 and compressor section 14, first turbine housing 26 housing first turbine section 16, and second turbine housing 28 houses second turbine section 18.

Fan section 12 includes fan inlet 30, fan duct 32, fan outlet 34, and fan rotor 36. Fan section 12 typically draws in ram air from a ram air scoop or alternatively from an associated gas turbine or other aircraft component. Air is drawn into fan inlet 30 and is ducted through fan duct 32 to fan outlet 34. Fan rotor 36 is positioned in fan duct 32 adjacent to fan inlet 30 and is mounted to and rotates with tie rod 20. Fan rotor 36 draws air into fan section 12 to be routed through air cycle machine 10.

Compressor section 14 includes compressor inlet 40, compressor duct 42, compressor outlet 44, compressor rotor 46, and diffuser 48. Air is routed into compressor inlet 40 and is ducted through compressor duct 42 to compressor outlet 44. Compressor rotor 46 and diffuser 48 are positioned in compressor duct 42. Compressor rotor 46 is mounted to and rotates with tie rod 20 to compress the air flowing through compressor duct 42. Diffuser 48 is a static structure through which the compressor air can flow after it has been compressed with compressor rotor 46. Air exiting diffuser 48 can then exit compressor duct 42 through compressor outlet 44.

First turbine section 16 includes first turbine inlet 50, first turbine duct 52, first turbine outlet 54, and first turbine rotor 56. Air is routed into first turbine inlet 50 and is ducted through first turbine duct 52 to first turbine outlet 54. First turbine rotor 56 is positioned in first turbine duct 52 and is mounted to and rotates with tie rod 20. First turbine rotor 56 will extract energy from the air passing through first turbine section 16 to drive rotation of tie rod 20.

Section turbine section 18 includes second turbine inlet 60, second turbine duct 62, second turbine outlet 64, and second turbine rotor 66. Air is routed into second turbine inlet 60 and is ducted through second turbine duct 62 to second turbine outlet 64. Second turbine rotor 66 is positioned in second turbine duct 62 and is mounted to and rotates with tie rod 20. Second turbine rotor 66 will extract energy from the air passing through second turbine section 18 to drive rotation of tie rod 20.

Air cycle machine 10 further includes first journal bearing 70, first rotating shaft 72, second journal bearing 74, and second rotating shaft 76. First journal bearing 70 is positioned in fan section 12 and is supported by fan and compressor housing 22. First rotating shaft 72 extends between and rotates with fan rotor 34 and compressor rotor 44. A radially outer surface of first rotating shaft 72 abuts a radially inner surface of first journal bearing 70. Second journal bearing 74 is positioned in first turbine section 16 and is supported by first turbine housing 26. Second rotating shaft 76 extends between and rotates with first turbine rotor 54 and second turbine rotor 64. A radially outer surface of second rotating shaft 76 abuts a radially inner surface of second journal bearing 74.

Figure 2:
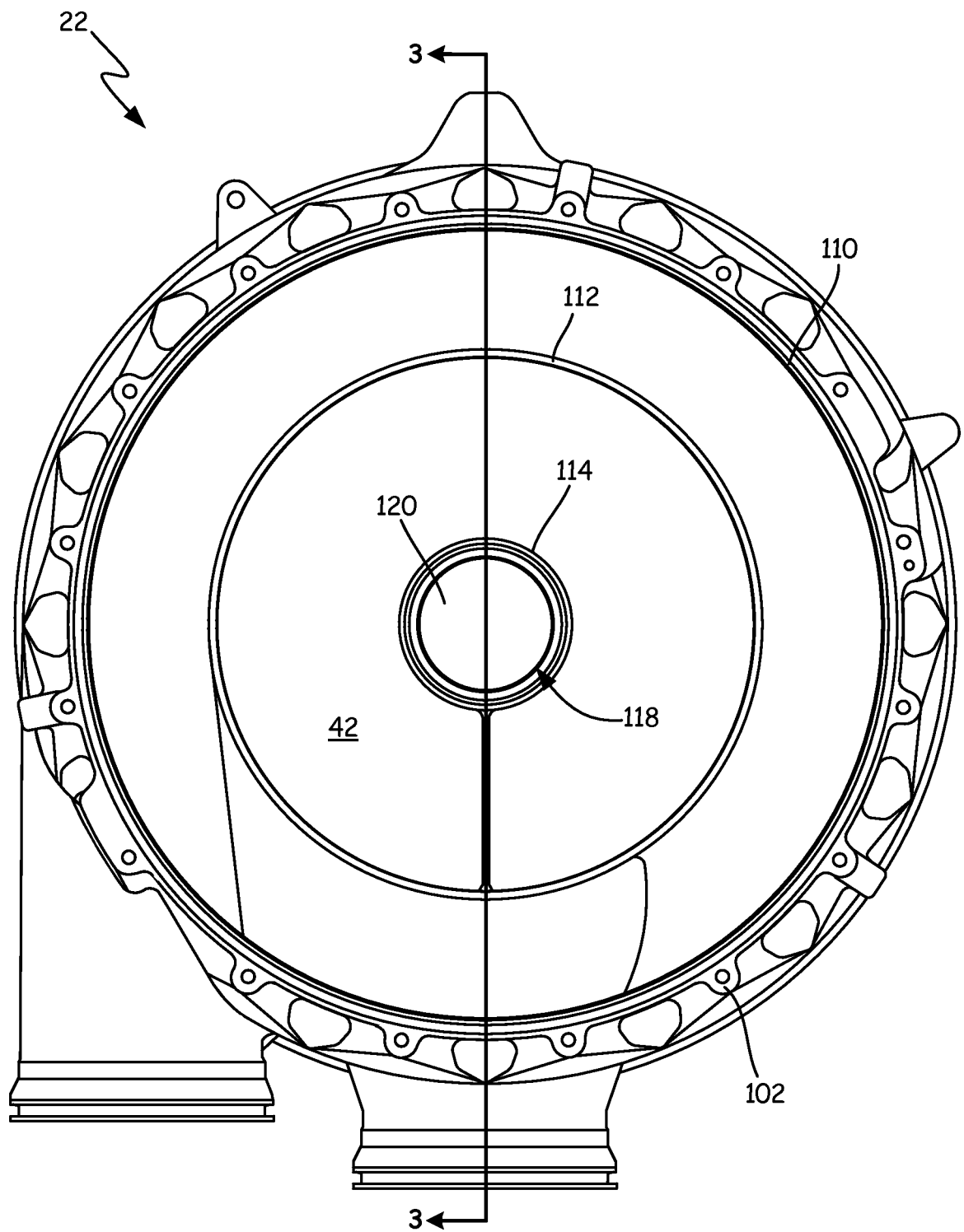
FIG. 2 is a front plan view of a fan and compressor housing in the air cycle machine.
Figure 3:
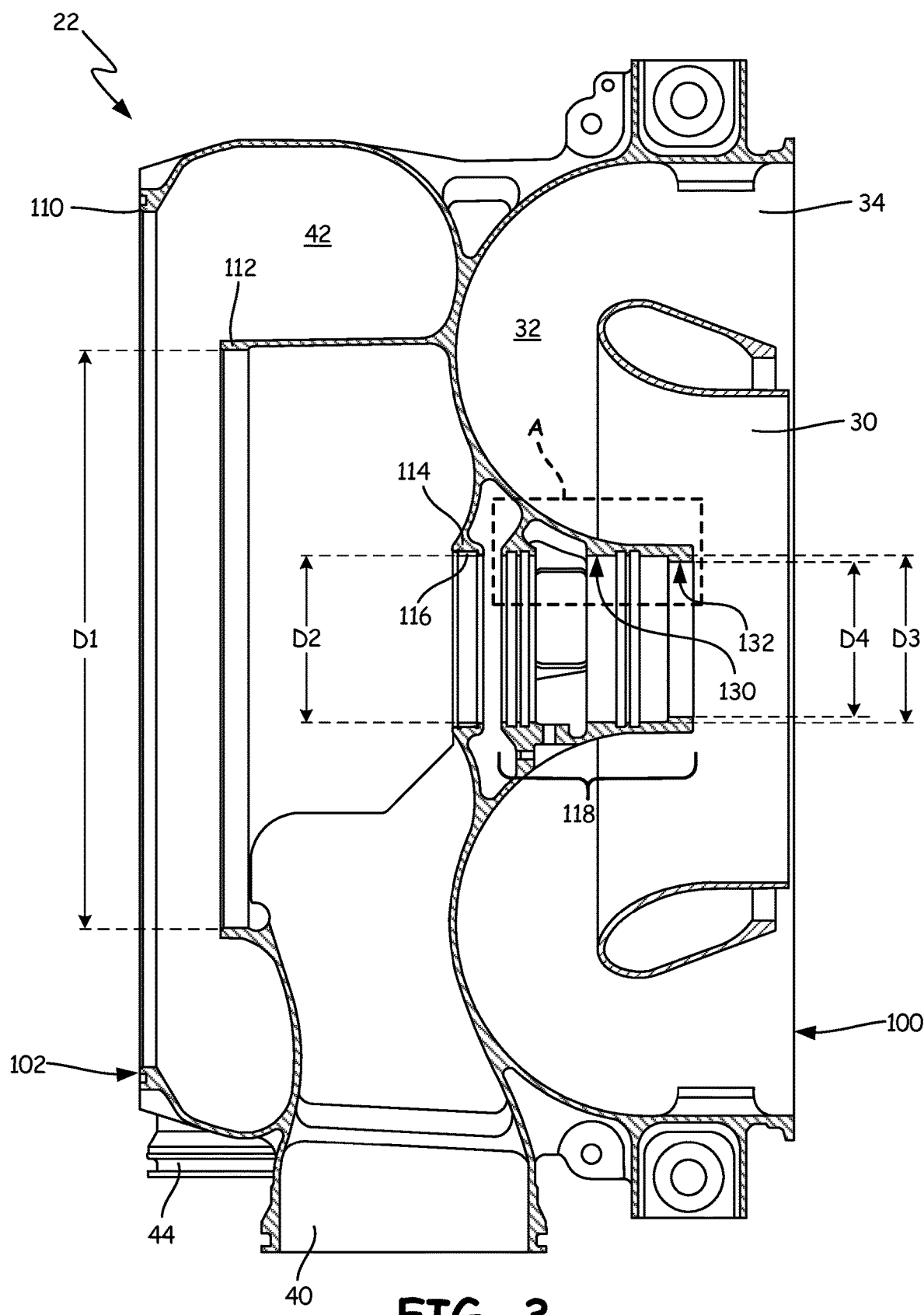
FIG. 3 is a cross-sectional view of the fan and compressor housing taken along line 3-3 of FIG. 2.
Figure 4:
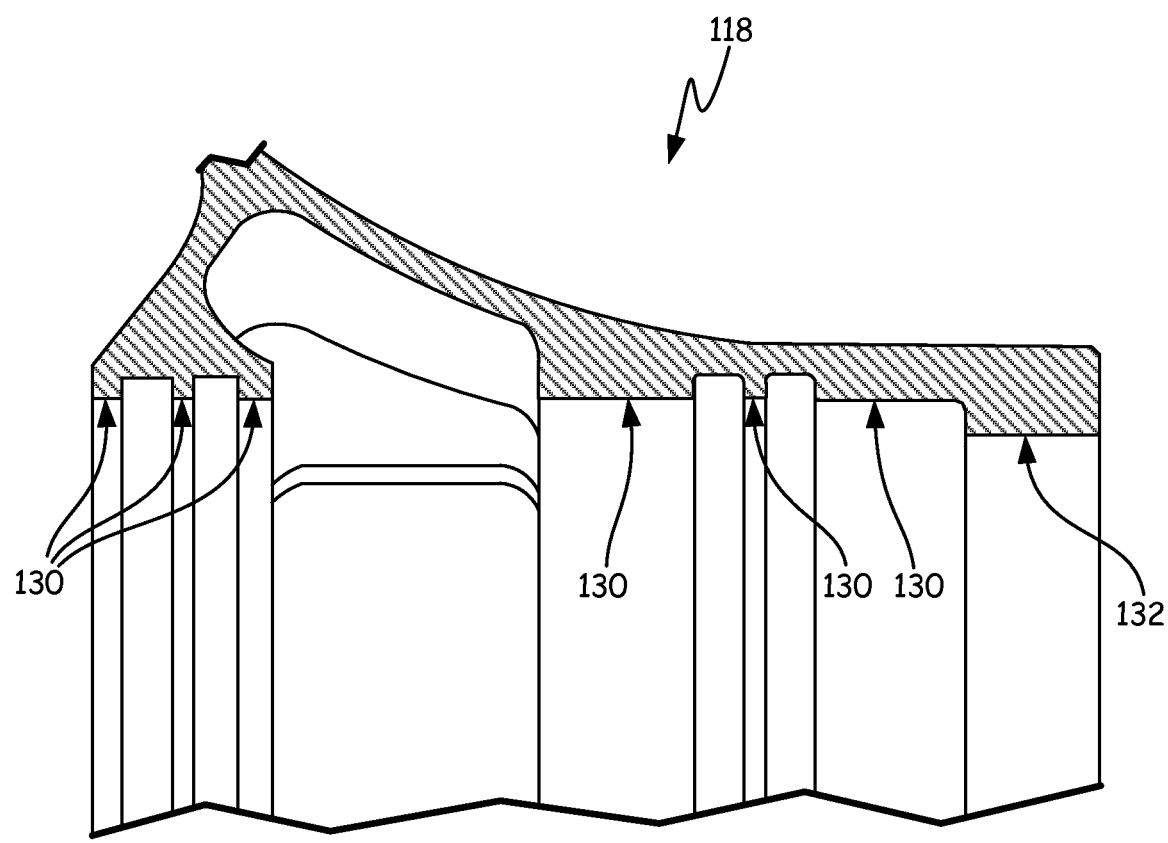
FIG. 4 is a partial cross-sectional view of the fan and compressor housing indicated with dashed line A in FIG. 3.

FIG. 2 is a front plan view of fan and compressor housing 22 in air cycle machine 10. FIG. 3 is a cross-sectional view of fan and compressor housing 22 taken along line 3-3 of FIG. 2. FIG. 4 is a partial cross-sectional view of fan and compressor housing 22 indicated with dashed line A in FIG. 3. FIGS. 2-4 show fan and compressor housing 22 rotated 90 degrees with respect to the view seen in FIG. 1. Fan and compressor housing 22 includes fan inlet 30, fan duct 32, fan outlet 34, compressor inlet 40, compressor duct 42, compressor outlet 44, first end 100, second end 102, first annular flange 110, second annular flange 112, third annular flange 114, seal 116, collar 118, and bore 120. Collar 118 includes first surface 130 and second surface 132.

Fan and compressor housing 22 includes first end 100 and second end 102 opposite first end 100. First end 100 is an open end of air cycle machine 10 that can be connected to other aircraft components. Second end 102 will be connected to first turbine housing 26 when fan and compressor housing 22 is mounted in air cycle machine 10 (as shown in FIG. 1).

Fan inlet 30 is positioned at first end 100 of fan and compressor housing 22. Fan inlet 30 can draw air into fan duct 32. Fan duct 32 is a first duct in fan and compressor housing 22. Fan duct 32 extends between fan inlet 30 and fan outlet 34. Air that is drawn into fan inlet 30 can flow through fan duct 32 and exit out of fan outlet 34. Fan outlet 34 is also positioned at first end 100 of fan and compressor housing 22 and radially encompasses fan inlet 30.

Compressor inlet 40 is positioned on a side of fan and compressor housing 22 adjacent second end 102. Air can flow through compressor inlet 40 into compressor duct 42. Compressor duct 42 is a second duct in fan and compressor housing 22. Compressor duct 42 extends between compressor inlet 40 and compressor outlet 44. Air that flows into compressor inlet 40 can travel through compressor duct 42 and exit out of compressor outlet 44. Compressor outlet 44 is also positioned on a side of fan and compressor housing 22 adjacent both second end 102 and compressor inlet 40.

Fan and compressor housing 22 includes first annular flange 110, second annular flange 112, and third annular flange 114. First annular flange 110 is positioned at second end 102 of fan and compressor housing 22. First annular flange 110 includes a plurality of mounting flanges to mount fan and compressor housing 22 to first turbine housing 26 with fasteners (as shown in FIG. 1).

Second annular flange 112 is positioned adjacent to second end 102 of fan and compressor housing 22. Second annular flange 112 includes a radially inner surface that can be positioned around a flange on diffuser 48 (as shown in FIG. 1). This forms a seal between second annular flange 112 of fan and compressor housing 22 and diffuser 48. Second annular flange 112 has first diameter D1 between radially inner surfaces of second annular flange 112. Diameter D1 is between 11.3010 inches and 11.3040 inches.

Third annular flange 114 and seal 116 are positioned in a center of fan and compressor housing 22 adjacent to collar 118. Third annular flange 114 includes a radially inner surface against which seal 116 can be positioned. Seal 116 is a soft material seal, such as a polyimide seal. Third annular flange 114 and seal 116 can be positioned around first rotating shaft 72 in air cycle machine 10 (as shown in FIG. 1). This forms a seal between third annular flange 114 and seal 116 of fan and compressor housing 22 and first rotating shaft 72. Third annular flange 114 and seal 116 have second diameter D2 between radially inner surfaces of seal 116. Diameter D2 is between 3.2590 inches and 3.2610 inches.

Collar 118 is positioned in a center of fan and compressor housing 22 and extends toward first end 100 of fan and compressor housing 22. Bore 120 runs through a center of collar 118. First rotating shaft 72 and tie rod 20 of air cycle machine 10 can be positioned in bore 120 of fan and compressor housing 22 (as shown in FIG. 1).

Collar 118 includes first surface 130 and second surface 132. First surface 130 is an annular surface that faces radially inward and is positioned to abut first journal bearing 70 in air cycle machine 10 (as shown in FIG. 1). First surface 130 includes a plurality of annular recesses in which seal rings can be positioned between collar 118 and first journal bearing 70. First surface 130 has diameter D3 between radially inner faces of first surface 130. Diameter D3 is between 3.2250 inches and 3.2290 inches.

Second surface 132 of collar 118 is an annular surface that faces radially inward and is positioned to abut first rotating shaft 72 in air cycle machine 10 (as shown in FIG. 1). Second surface 132 is a monolithic part of air cycle machine 10 and is made out of the same material as fan and compressor housing 22, for example aluminum. Second surface 132 acts as a seal between fan and compressor housing 22 and first rotating shaft 72. Second surface 132 has diameter D4 between radially inner faces of second surface 132. Diameter D4 is between 2.7710 inches and 2.7730 inches.

Table 1 below is a list of different ratios of diameters D1-D4.

TABLE 1

A list of ratios of diameters D1-D4.

| Ratio | Minimum | Maximum |
| --- | --- | --- |
| D2/D1 | 0.2883 | 0.2886 |
| D3/D1 | 0.2853 | 0.2857 |
| D3/D2 | 0.9890 | 0.9908 |
| D3/D4 | 1.1630 | 1.1653 |
| D4/D1 | 0.2451 | 0.2454 |
| D4/D2 | 0.8497 | 0.8509 |

Making second surface 132 monolithic with fan and compressor housing 22 is advantageous, as it allows second surface 132 to act as a seal, and a soft material seal is not required. This simplifies the manufacture and assembly of air cycle machine 10. Second surface 132 can be designed to optimize clearance between collar 118 and first rotating shaft 72 so that first rotating shaft 72 can rotate within collar 118. Optimizing the clearance between collar 118 and first rotating shaft 72 also allows for optimization of air leakage between collar 118 and first rotating shaft 72. Air leakage between collar 118 and first rotating shaft 72 can be used to cool first journal bearing 70.

DISCUSSION OF POSSIBLE EMBODIMENTS

The following are non-exclusive descriptions of possible embodiments of the present invention.

A housing for an air cycle machine includes a housing with a first end and a second end opposite the first end, a first duct adjacent the first end of the housing with an air inlet and an air outlet, a second duct adjacent the second end of the housing with an air inlet and an air outlet, and a collar in the housing extending from a center of the housing towards the first end of the housing. The collar includes a first annular surface facing radially inward and configured to engage a journal bearing, and a second annular surface facing radially inward and configured to engage a rotating shaft, wherein the second annular surface is configured to provide a sealing surface that is monolithic with the housing.

The housing of the preceding paragraph can optionally include, additionally and/or alternatively, any one or more of the following features, configurations and/or additional components:

A ratio of a diameter of the first annular surface of the collar to a diameter of the second annular surface of the collar is between 1.1630 and 1.1653.

The housing further includes a first annular flange adjacent to the second end of the housing with a radially inner surface configured to engage a static part.

A ratio of a diameter of the first annular surface of the collar to a diameter of the first annular flange is between 0.2853 and 0.2857.

A ratio of a diameter of the second annular surface of the collar to a diameter of the first annular flange is between 0.2451 and 0.2454.

The housing further includes a second annular flange adjacent to the collar, and a seal positioned against an inner surface of the second annular flange, wherein a radially inner surface of the seal is configured to engage a rotating part.

A ratio of a diameter of the first annular surface of the collar to a diameter of the seal on the second annular flange is between 0.9890 and 0.9908.

A ratio of a diameter of the second annular surface of the collar to a diameter of the seal on the second annular flange is between 0.8497 and 0.8509.

An air cycle machine includes a tie rod that is configured to rotate about an axis, a fan section with a fan rotor mounted to the tie rod, a compressor section with a compressor rotor mounted to the tie rod, a first turbine section with a first turbine rotor mounted to the tie rod, a first turbine housing, and a fan and compressor housing connected to the first turbine housing. The fan and compressor housing includes a first end, a second end adjacent to the first turbine housing and opposite of the first end, a fan duct adjacent to the first end of the fan and compressor housing, wherein the fan rotor is positioned in the fan duct, a compressor duct adjacent to the second end of the fan and compressor housing, wherein the compressor rotor is positioned in the compressor duct, and an annular collar in the housing and extending towards the first end of the fan and compressor housing. The annular collar includes a first annular surface facing radially inward to engage a journal bearing, and a second annular surface facing radially inward to engage a rotating shaft, wherein the second annular surface is configured to provide a sealing surface that is monolithic with the housing.

The air cycle machine of the preceding paragraph can optionally include, additionally and/or alternatively, any one or more of the following features, configurations and/or additional components:

The air cycle machine further includes a second turbine section with a second turbine rotor mounted to the tie rod, and a second turbine housing connected to the first turbine housing.

A ratio of a diameter of the first annular surface of the collar to a diameter of the second annular surface of the collar is between 1.1630 and 1.1653.

The fan and compressor housing further includes a first annular flange adjacent to the second end of the fan and compressor housing with a radially inner surface configured to engage a diffuser.

A ratio of a diameter of the second annular surface of the collar to a diameter of the first annular flange is between 0.2451 and 0.2454.

The fan and compressor housing further includes a second annular flange adjacent to the collar, and a seal positioned against an inner surface of the second annular flange, wherein a radially inner surface of the seal is configured to engage the rotating shaft.

A ratio of a diameter of the second annular surface of the collar to a diameter of the seal on the second annular flange is between 0.8497 and 0.8509.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A housing for an air cycle machine, the housing comprising:
   a housing with a first end and a second end opposite the first end;
   a first duct adjacent the first end of the housing with an air inlet and an air outlet;
   a second duct adjacent the second end of the housing with an air inlet and an air outlet; and
   a collar in the housing extending from a center of the housing towards the first end of the housing, the collar comprising:
      a first annular surface facing radially inward and configured to engage a journal bearing;
      an annular recess in the first annular surface that is configured to receive a seal ring; and
      a second annular surface facing radially inward and configured to engage a rotating shaft, wherein the second annular surface is a uniform, cylindrical surface extending from a first end adjacent a first end of the collar to a second end adjacent the first annular surface, wherein the second annular surface is configured to directly engage the rotating shaft to provide a sealing surface that is monolithic with the housing;

wherein a diameter of the first annular surface is larger than a diameter of the second annular surface; and wherein the second annular surface is disposed between the first annular surface and the first end of the housing.

2. The housing of claim 1, wherein a ratio of the diameter of the first annular surface of the collar to the diameter of the second annular surface of the collar is between 1.1630 and 1.1653.

3. The housing of claim 1, and further comprising:
a first annular flange adjacent to the second end of the housing with a radially inner surface configured to engage a static part.

4. The housing of claim 3, wherein a ratio of the diameter of the first annular surface of the collar to a diameter of the first annular flange is between 0.2853 and 0.2857.

5. The housing of claim 3, wherein a ratio of the diameter of the second annular surface of the collar to a diameter of the first annular flange is between 0.2451 and 0.2454.

6. The housing of claim 1, and further comprising:
a second annular flange adjacent to the collar; and
a seal positioned against an inner surface of the second annular flange, wherein a radially inner surface of the seal is configured to engage a rotating part.

7. The housing of claim 6, wherein a ratio of the diameter of the first annular surface of the collar to a diameter of the seal on the second annular flange is between 0.9890 and 0.9908.

8. The housing of claim 6, wherein a ratio of the diameter of the second annular surface of the collar to a diameter of the seal on the second annular flange is between 0.8497 and 0.8509.

9. An air cycle machine comprising:
a tie rod that is configured to rotate about an axis;
a fan section with a fan rotor mounted to the tie rod;
a compressor section with a compressor rotor mounted to the tie rod;
a first turbine section with a first turbine rotor mounted to the tie rod;
a first turbine housing; and
a fan and compressor housing connected to the first turbine housing, wherein the fan and compressor housing comprises:
a first end;
a second end adjacent to the first turbine housing and opposite of the first end;
a fan duct adjacent to the first end of the fan and compressor housing, wherein the fan rotor is positioned in the fan duct;
a compressor duct adjacent to the second end of the fan and compressor housing, wherein the compressor rotor is positioned in the compressor duct; and
an annular collar in the fan and compressor housing and extending towards the first end of the fan and compressor housing, wherein the annular collar comprises:
a first annular surface facing radially inward to engage a journal bearing;
an annular recess in the first annular surface that is configured to receive a seal ring; and
a second annular surface facing radially inward to engage a rotating shaft, wherein the second annular surface is a uniform, cylindrical surface extending from a first end adjacent a first end of the collar to a second end adjacent the first annular surface, wherein the second annular surface is configured to directly engage the rotating shaft to provide a sealing surface that is monolithic with the fan and compressor housing;
wherein a diameter of the first annular surface is larger than a diameter of the second annular surface; and
wherein the second annular surface is disposed between the first annular surface and the first end of the fan and compressor housing.

10. The air cycle machine of claim 9, and further comprising:
a second turbine section with a second turbine rotor mounted to the tie rod; and
a second turbine housing connected to the first turbine housing.

11. The air cycle machine of claim 9, wherein a ratio of the diameter of the first annular surface of the collar to the diameter of the second annular surface of the collar is between 1.1630 and 1.1653.

12. The air cycle machine of claim 9, wherein the fan and compressor housing further comprises:
a first annular flange adjacent to the second end of the fan and compressor housing with a radially inner surface configured to engage a diffuser.

13. The air cycle machine of claim 12, wherein a ratio of the diameter of the second annular surface of the collar to a diameter of the first annular flange is between 0.2451 and 0.2454.

14. The air cycle machine of claim 9, wherein the fan and compressor housing further comprises:
a second annular flange adjacent to the collar; and
a seal positioned against an inner surface of the second annular flange, wherein a radially inner surface of the seal is configured to engage the rotating shaft.

15. The air cycle machine of claim 14, wherein a ratio of the diameter of the second annular surface of the collar to a diameter of the seal on the second annular flange is between 0.8497 and 0.8509.

* * * * *